United States Patent [19]

McClelland

[11] 3,965,071

[45] June 22, 1976

[54] POLYESTER CATALYSTS

[75] Inventor: Euan McClelland, Harrogate, England

[73] Assignee: Imperial Chemical Industries Limited, London, England

[22] Filed: July 1, 1974

[21] Appl. No.: 484,937

[30] Foreign Application Priority Data
July 16, 1973 United Kingdom............ 33716/73

[52] U.S. Cl. .......................... 260/75 R; 260/47 C
[51] Int. Cl.² ...................................... C08G 63/14
[58] Field of Search .................. 260/75 R, 47 C

[56] References Cited
UNITED STATES PATENTS

| | | | |
|---|---|---|---|
| 2,822,348 | 2/1958 | Haslam | 260/75 |
| 3,326,965 | 6/1967 | Schultheis et al. | 260/475 |
| 3,453,241 | 7/1969 | Jeurissen et al. | 260/75 |
| 3,674,747 | 7/1972 | Schnegg et al. | 260/75 |
| 3,682,864 | 8/1972 | Siclari et al. | 260/75 |

FOREIGN PATENTS OR APPLICATIONS 851,600  10/1960  United Kingdom

*Primary Examiner*—Murray Tillman
*Assistant Examiner*—W. C. Danison, Jr.
*Attorney, Agent, or Firm*—Cushman, Darby & Cushman

[57] ABSTRACT

Manufacture of polyesters and copolyesters by reaction of at least one aromatic dicarboxylic acid with at least one glycol in presence of titanium compound, deactivation of catalyst by reaction with phosphoric acid or ester and polycondensation in presence of antimony compound.

21 Claims, No Drawings

POLYESTER CATALYSTS

The present invention relates to the manufacture of polyesters and copolyesters by the reaction of at least one aromatic dicarboxylic acid with at least one glycol.

It is known, for example from British Pat. Specification No. 851,600, to prepare esters of carboxylic acids and polyhydric alcohols by reacting in the liquid phase at elevated temperature in the presence of a catalytic quantity of a variety of titanium compounds. In further reaction under polycondensation conditions the titanium catalyst is effective to catalyse the polycondensation with production of polyesters. However, we have found that when employing such catalysts in the production of polyesters, the products are of poor colour and relatively low softening points resulting from the relatively high content of diethylene glycol containing linkages. It is known, for example from British Pat. Specifications Nos. 588,833 and 769,220, to employ a variety of trivalent and pentavalent phosphorus compounds as inhibitors of colour formation in the manufacture of polyesters. We have found that when using a titanium compound as catalyst the use of trivalent phosphorus compounds as inhibitors of colour formation has been inadequate. On the other hand, the effect of phosphoric acid or a phosphate ester in amount adequate to affect the degree of colour formation is to inhibit the titanium catalyst. We have now found a method of obtaining the beneficial effects of titanium catalyst without the normally attendant disadvantages.

According to the present invention we provide a process for the manufacture of polyesters and copolyesters by the reaction of at least one aromatic dicarboxylic acid with at least one diol in the presence as catalyst of a titanium compound soluble in the reaction mixture, until esterification is substantially complete, deactivation of the titanium compound by reaction with phosphoric acid or a phosphate ester and polycondensation in the presence as catalyst of an antimony and/or a germanium compound soluble in the reaction mixture.

Suitable aromatic dicarboxylic acids for use in the process of our invention are for example, terephthalic acid, naphthalene-2:6-dicarboxylic acid, 1:2-diphenoxyethane-4:4'-dicarboxylic acid and biphenyl-4:4'-dicarboxylic acid. We prefer terephthalic acid. In cases wherein a second dicarboxylic acid is reacted, the second dicarboxylic acid may be isophthalic acid or adipic acid.

Suitable diols for use in the process of our invention are, for example, those of formula $HO/CH_2)_nOH$ where $n$ is not less than 2 and not greater than 10. We prefer to use ethylene glycol and butane diol. More particularly we prefer ethylene glycol.

Suitable titanium compounds for use in the process of our invention are organic titanates, particularly alkyl titanates, for example tetraalkyl titanate where alkyl is of 1 to 4 carbon atoms, the titanates of ethylene glycol, hexylene glycol and octylene glycol, isopropyl triethanolamine titanate, inorganic titanates, for example sodium titanate and lithium titanate, and the titanium-containing compounds described in British Pat. Specification No. 1,342,489 the latter compounds being titanosiloxanes obtained by reacting a first compound of the formula

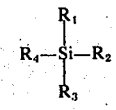

with a second compound of the formula

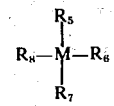

wherein:
a. M is selected from the group consisting of titanium, zirconium, germanium, silicon, lead, and tin;
b. $R_2$ and $R_1$ are selected from the group consisting of chlorine and hydroxy;
c. the remaining R substituents are selected from the group consisting of alkyl of 1 to 18 carbon atoms, acyl of 1 to 18 carbons, alkoxy of 1 to 18 carbon atoms, aryl of 6 to 18 carbon atoms, aryloxy of 6 to 18 carbon atoms, and hydrogen, provided that at least one of $R_5$, $R_6$, $R_7$ and $R_8$ is not hydrogen and
d. in said reaction from 1.1 to 20 moles of said second compound per mole of said first compound are reacted for from 50 minutes to 6 hours at 50° to 250°C. The proportion of titanium compound employed as catalyst may be as little as 0.0005% or as much as 0.05% expressed in terms of titanium based on the weight of terephthalic acid equivalent to the dicarboxylic acid or acids reacted.

Deactivation of the titanium compound catalyst is effected by the addition to the reaction mixture after esterification of phosphoric acid or phosphate ester in such proportion in relation to the titanium compound as to render it substantially, preferably completely, catalytically inactive. We have found that the use of one molecule of phosphoric acid for one atom of titanium is satisfactory. However, additional phosphoric acid or phosphate ester may usefully be added to act as stabiliser, for example a total of 1,160 parts per million expressed as phosphoric acid based on the dicarboxylic acid or acids expressed as terephthalic acid.

Completion of esterification may be judged by the evolution in the form of vapour of the theoretically obtainable quantity of water.

Esterification may most conveniently be effected at or above the atmospheric pressure boiling point of the reaction mixture. If reaction is carried out at superatmospheric pressure, the water vapour will preferably be purged continously from the system.

In the process of our invention, any appropriate ratio of diol to dicarboxylic acid may be employed, for example as low as 1.05:1 or as high as 3:1 molecularly.

In the process of our invention, either or both stages may be carried out continuously.

The antimony and germanium may be in soluble form when added to the reaction mixture, for example in the form of antimony trioxide, antimonic acid, antimony glycoloxide, antimony triacetate or antimony trichloride, or germanium dioxide in the amorphous form, germanium tetrachloride, salts of germanium acids or compounds derived from ethylene glycol and germanium. Otherwise a suitable form of the metal or of a compound which is insoluble may be added which forms a soluble compound by reaction with the ethylene glycol used as reactant, for example antimony or germanium metal in finely divided form or germanium dioxide in the hexagonal crystalline form in finely divided state. Although the polycondensation catalyst may be added at an earlier stage, we prefer to add it after the esterification stage is completed.

Using the process according to our invention, polyesters have been produced with very good colour, high softening point and low content of diethylene glycol containing linkages.

If desired, the terephthalate of a base may be present during the esterification stage in order to minimise the degree of formation of diethylene glycol containing linkages in the resultant polyester. Preferably the proportion of terephthalate employed is from 10 to 500 parts per million, expressed as sodium hydroxide equivalent to the terephthalate, on terephthalic acid equivalent to the dicarboxylic acid or acids reacted. The terephthalate may be formed by addition of a base, preferably sodium hydroxide to the esterification reaction mixture.

At least a proportion of the polycondensation may be carried out by solid phase polycondensation.

The process of our invention is of particular utility in the manufacture of poly(ethylene terephthalate) and particularly for use in the manufacture of fibres and films.

In the following examples, in which parts are by weight, Example 15, 16, 19 to 22, 26, and 27 are for comparison purposes.

EXAMPLE 1

Terephthalic acid (85.5 parts) and ethylene glycol (40 parts) were heated together in the presence of sodium hydroxide (58 parts per million, based on terephthalic acid) to a temperature of 230°C. and reacted with gradually rising temperature to a final temperature of 250°C. with periodical venting off of the water vapour formed by the reaction in order to maintain a total pressure of 40 pounds per square inch gauge. The total reaction time was 140 minutes. During the final 20 minutes the pressure was reduced by venting off to finish at atmospheric pressure. To the esterification reaction product was added phosphoric acid (0.035% by weight, based on the terephthalic acid) and the reaction product was stirred for 2 minutes. Titanium dioxide of pigment grade was added (in a little ethylene glycol) in the proportion 0.58% by weight based on terephthalic acid followed by antimony trioxide (0.058% by weight). The temperature of the reaction mixture was then raised to 290°C. and the reaction continued under a pressure of 0.2 mm of mercury. The degree of polycondensation was estimated from the power required to drive the agitator and was judged to have reached the desired stage. The time for polycondensation is calculated from the point at which pressure reduction commenced.

EXAMPLES 2, 3 and 4

Example 1 was repeated with the addition of varying amounts of tetraisopropyl titanate as indicated in the Table. The total reaction time for the esterification in each case was 100 minutes. Phosphoric acid in the amount indicated in the Table was added as in Example 1 followed by antimony trioxide in the amount indicated in the Table. The results are given in Table A.

TABLE A

| Example No. | Tetra isopropyl titanate (%) | Esterification time (min.) | Polycondensation time (min.) | $H_3PO_4$ (%) | $Sb_2O_3$ (%) | VR | L | Y | SP (°C) | DEG moles % |
|---|---|---|---|---|---|---|---|---|---|---|
| 1 | NIL | 140 | 105 | .035 | .058 | 1.80 | 70 | 5 | 258.1 | 2.8 |
| 2 | .058 | 100 | 102 | .035 | .058 | 1.79 | 69 | 15 | 261.2 | 1.4 |
| 3 | .029 | 100 | 98 | .035 | .058 | 1.81 | 68 | 7 | 260.8 | 1.6 |
| 4 | .0116 | 100 | 95 | .047 | .047 | 1.80 | 77 | 12 | 260.3 | 2.0 |

SP signifies softening point
DEG signifies diethylene glycol

L and Y stand for luminance and yellowness as determined using a "Colormaster" differential colorimeter manufactured by the Manufacturer's Engineering and Equipment Corporation. A high value of L-Y accompanied by a high value of L is a measure of superior visual appearance, and also correlates with superior visual appearance of articles fabricated from the polyester by melt extrusion, for example fibres and films. Viscosity ratio (VR) is as measured in orthochlorophenol at 1 g. per 100 ml. of solvent concentration at 25°C. The diethylene glycol content (DEG) of the polymer is expressed as moles % of the total glycols produced by hydrolysis of the polymer.

EXAMPLE 5

Example 2 was repeated with the exception that no antimony trioxide was added. No increase in molecular weight was apparent in the polycondensation stage, showing that the tetraisopropyl titanate was ineffective as a polycondensation catalyst.

EXAMPLES 6 to 16

These Examples demonstrate the use of various titanium compounds. In each Example the experimental details were as in Example 1 except where indicated otherwise in Table 1, in which the results are shown. In Examples 13 and 16 no terephthalate of a base was added.

EXAMPLES 17 to 20

These Examples, of which the results are shown in Table 2, show the use of various phosphorus compounds. Example 19 shows the use of triphenyl phosphite, which is not according to the process of our invention. It can be seen from the low value of L - Y that triphenyl phosphite is ineffective in inhibiting colour formation. In each Example the experimental details were as in Example 1 except where indicated otherwise in Table 2, and with the exception that in Example 20 the triphenyl phosphate was added at the start of esterification.

EXAMPLES 21 and 22

These Examples, of which the results are shown in Table 3, show the inhibiting effect on the titanium catalyst of phosphoric acid. In Example 22, the phosphoric acid was added at the end of the esterification stage. Experimental details were as for Example 1 except where indicated in Table 3, and that no antimony compound was added.

EXAMPLES 23 and 24

These Examples show the preparation of a copolyester of which the main dicarboxylic acid component is terephthalic acid and the minor dicarboxylic acid component is isophthalic acid. In each Example, in the esterification stage 79.1 parts of terephthalic acid and 6.4 parts of isophthalic acid were reacted with 40 parts were as described in Example 1, except that the quantity of phosphoric acid used was 0.047% based on the sum of the dicarboxylic acids, and except where indicated otherwise in Table 4, in which the results are shown.

EXAMPLES 25 and 26

These Examples show the use of germanium dioxide as polycondensation catalyst. The experimental details were as in Example 1 except where otherwise indicated in Table 5, in which the results are shown, and that germanium dioxide was used in place of antimony compound.

TABLE 1

| | | 100 lb-scale polymers : alternative Ti compounds | | | | | | | | | | |
|---|---|---|---|---|---|---|---|---|---|---|---|---|
| Example | Ti Compound | $H_3PO_4$ (%) | $Sb_2O_3$ (%) | TA (parts) | ethylene glycol (parts) | $Est^n$ time (mins) | P/C time (mins) | VR | L | Y | S Pt (°C) | DEG (moles %) |
| 6 | .035% tetra-n-butyl titanate | .035 | .058 | 85.5 | 40 | 100 | 104 | 1.80 | 71 | 12 | 260.5 | 1.73 |
| 7 | .029% hexylene glycol titanate | .035 | .058 | 85.5 | 40 | 100 | 102 | 1.79 | 74 | 9 | 260.2 | 1.76 |
| 8 | .058% isopropyl triethanolamine titanate | .035 | .058 | 85.5 | 40 | 100 | 102 | 1.80 | 71 | 15 | 261.0 | 1.39 |
| 9 | .045% titanosiloxane | .035 | .058 | 85.5 | 40 | 100 | 105 | 1.80 | 71 | 9 | 259.9 | 1.78 |
| 10 | .062% titanium lactate | .047 | .058 | 85.5 | 45 | 120 | 94 | 1.77 | 67.5 | 13 | 259.2 | 2.02 |
| 11 | .029% lithium titanate | .047 | .058 | 85.5 | 45 | 120 | 109 | 1.80 | 66 | 6 | 259.6 | 2.24 |
| 12 | .029% tetra octylene glycol titanate | .047 | .058 | 85.5 | 45 | 120 | 99 | 1.79 | 72 | 7 | 259.0 | 2.2 |
| 13 | .022% sodium titanate | .047 | .058 | 85.5 | 45 | 140 | 112 | | 70 | 5 | 258.0 | 2.8 |
| 14 | .029% tetraethylene glycol titanate | .035 | .058 | 85.5 | 40 | 100 | 108 | 1.79 | 73 | 10 | 260.7 | 1.85 |
| 15 | .058% tetra isopropyl titanate | .047 | .047 | 85.5 | 40 | 100 | 90 | 1.79 | 73 | 23 | 258.8 | 3.4 |
| 16 | .050% tetra octylene glycol titanate | None | .058 | 85.5 | 45 | 140 | 138 | 1.84 | 62 | 19 | 251.4 | 6.5 |

$Est^n$ = esterification
P/C = polycondensation
TA = terephthalic acid

TABLE 2

| | | 100 lb-scale polymers : alternative phosphorus compounds | | | | | | | | | |
|---|---|---|---|---|---|---|---|---|---|---|---|
| Example | Tetra isopropyl titanate (%) | Phosphorus compound | $Sb_2O_3$ (%) | TA (parts) | ethylene glycol (parts) | $Est^n$ time (mins) | P/C time (mins) | VR | L | Y | S Pt (°C) | DEG (moles %) |
| 17 | .029 | .047% $H_3PO_4$ | .058 | 85.5 | 45 | 120 | 104 | 1.80 | 73 | 10 | 260.1 | 1.91 |
| 18 | .029 | .17% triphenyl phosphate | .058 | 85.5 | 45 | 120 | 110 | 1.79 | 66 | 9 | 260.3 | 1.65 |
| 19 | .058 | .17% triphenyl phosphite | .058 | 85.5 | 45 | 120 | 98 | 1.79 | 49 | 5 | 258.8 | 2.1 |
| 20 | .029 | .17% triphenyl phosphate | .058 | 85.5 | 45 | 120 | 116 | 1.8 | 64 | 23 | 258.5 | 2.65 |

TABLE 3

| | | Effect of stabiliser on catalytic activity of Ti cpd | | | | | | | | |
|---|---|---|---|---|---|---|---|---|---|---|
| Example | Tetra isopropyl titanate (%) | Phosphorus compound (stabiliser) | TA (parts) | ethylene glycol (parts) | $Est^n$ time (mins) | P/C time (mins) | VR | L | Y | S Pt (°C) | DEG (moles %) |
| 21 | .058 | None | 85.5 | 40 | 100 | 79 | 1.78 | 75 | 37 | 261.6 | 1.98 |
| 22 | .058 | .047% $H_3PO_4$ | 85.5 | 40 | 100 | did not polymerise | | | | | | of ethylene glycol. Otherwise the experimental details

TABLE 4

| | 100 lb.-scale polymers : 7½ mole % isophthalate copolymers | | | | | | | | |
|---|---|---|---|---|---|---|---|---|---|
| Batch Number | Tetra isopropyl titanate (%) | NaOH (%) | $Est^n$ time (mins) | P/C time (mins) | VR | L | Y | S Pt (°C) | DEG (moles %) |
| 23 | .029 | .017 | 100 | 110 | 1.79 | 69 | 8 | 244.3 | 1.5 |
| 24 | .029 | .0058 | 100 | 98 | 1.77 | 73 | 13 | 244.0 | 1.7 |

Batches were made with 79.1 parts TA, 6.4 parts IA, 40 parts glycol, .047% phosphoric acid and .058% $Sb_2O_3$

TABLE 5

| Batch Number | Tetra isopropyl titanate (%) | $H_3PO_4$ (%) | 100 lb-scale polymers : $GeO_2$ as p/c catalyst | | | | | VR | L | Y | S'Pt (°C) | DEG Moles (%) |
|---|---|---|---|---|---|---|---|---|---|---|---|---|
| | | | $GeO_2$ (%) | TA (parts) | ethylene glycol (parts) | Est" time (mins) | P/C time (mins) | | | | | |
| 25 | .029 | .047 | .027 | 85.5 | 45 | 140 | 103 | 1.79 | 81 | 13 | 259.0 | 2.5 |
| 26 | Nil | .047 | .027 | 85.5 | 45 | 140 | 104 | 1.80 | 84 | 12 | 257.0 | 4.0 |

EXAMPLE 27

This experiment was carried out according to Example 3 with the exception that no phosphous compounds was employed. The rate of evolution of water of reaction in the form of vapour was determined during the esterification by condensation of the vapour and measurement of the water content. This is a measure of the rate of esterification. For comparison, the results of the same measurement on Example 20 are given in Table 6.

TABLE 6

| Time of start of water distillation, minutes | % of theoretically obtainable water collected | |
|---|---|---|
| | Experiment 20 Triphenyl phosphate present | Experiment 27 Triphenyl phosphate absent |
| 0 | 0 | 0 |
| 30 | 20 | 33 |
| 60 | 40 | 50 |
| 80 | 52 | 70 |
| 100 | 68 | 89 |
| 120 | 83 | |

What we claim is:

1. A process for preparing a fiber-forming polymeric polyester or copolyester which comprises first forming an ester by esterification reaction between an aromatic dicarboxylic acid and a diol in the presence of a titanium compound as esterification catalyst, deactivating the catalytic titanium compound after the esterification is substantially complete by reacting said compound with phosphoric acid or a phosphate ester and thereafter polycondensing said ester in the presence of a polycondensation catalyst which is a compound selected from the group consisting of antimony and germanium compounds which are soluble in the reaction mixture to form said polyester or copolyester, the diol being a diol of the formula $HO(CH_2)_nOH$ wherein n is not less than 2 and not greater than 10 and the titanium compound being a tetraalkyl titanate wherein alkyl is of 1 to 4 carbon atoms, a titanate of ethylene glycol, hexylene glycol or octylene glycol, or isopropyl triethanolamine titanate, sodium or lithium titanate or a titanosiloxane.

2. A process according to claim 1 wherein the esterification reactants comprise terephthalic acid, naphthalene-2:6-dicarboxylic acid, 1:2-diphenoxyethane-4:4-dicarboxylic acid or biphenyl-4:4'-dicarboxylic acid.

3. A process according to claim 1 wherein the dicarboxylic acid is terephthalic acid.

4. A process according to claim 1 wherein the esterification reactants comprise a diol of the formula $HO(CH_2)_nOH$ wherein n is not less than 2 and not greater than 10.

5. A process according to claim 4 wherein n is 2 or 4.

6. A process according to claim 4 wherein the diol is ethylene glycol.

7. A process according to claim 1 wherein the polyester is poly(ethylene terephthalate).

8. A process according to claim 1 wherein the manufacture is of a copolyester comprising structural units based on a second dicarboxylic acid which is isophthalic acid or adipic acid.

9. A process according to claim 1 wherein the titanium compound is a tetraalkyl titanate wherein alkyl is of 1 to 4 carbon atoms, a titanate of ethylene glycol, hexylene glycol or octylene glycol, or isopropyl triethanolamine titanate.

10. A process according to claim 1 wherein the titanium compound is sodium or lithium titanate.

11. A process according to claim 1 wherein the titanium compound is a titanosiloxane.

12. A process according to claim 1 wherein the proportion of titanium compound employed is not less than 0.0005% and not greater than 0.05%, expressed in terms of titanium based on the weight of terephthalic acid equivalent to the dicarboxylic acid or acids reacted.

13. A process according to claim 1 wherein the quantity of phosphoric acid or phosphate ester added amounts to at least one molecule for each atom of titanium.

14. A process according to claim 1 wherein the quantity of phosphoric acid or phosphate ester does not exceed 1,160 part per million expressed as phosphoric acid based on the terephthalic acid equivalent of the dicarboxylic acid or acids reacted.

15. A process according to claim 1 wherein the esterification stage is carried out at superatmospheric pressure.

16. A process according to claim 1 wherein during the esterification the water vapour produced is purged continuously from the system.

17. A process according to claim 1 wherein the ratio of diol to dicarboxylic acid is no less than 1.05:1 and not greater than 3:1 molecularly.

18. A process according to claim 1 wherein the polycondensation catalyst employed is antimony trioxide, antimonic acid, antimony glycoloxide, antimony triacetate or antimony trichloride.

19. A process according to claim 1 wherein the polycondensation catalyst employed is germanium dioxide in the amorphous form, germanium tetrachloride, a salt of a germanium acid or a compound derived from ethylene glycol and germanium.

20. A process according to claim 1 wherein the polycondensation catalyst is added after the esterification stage is completed.

21. A process according to claim 1 wherein during the esterification stage the terephthalate of a base is present in amount not less than 10 and not greater than 500 parts per million, expressed as sodium hydroxide equivalent to the terephthalate, on terephthalic acid equivalent to the dicarboxylic acid or acids reacted.

* * * * *